(12) United States Patent
Lee (10) Patent No.: US 10,028,114 B2
(45) Date of Patent: Jul. 17, 2018

(54) METHOD AND APPARATUS FOR ADAPTIVE BARRING CONTROL FOR MO-SMS IN WIRELESS ACCESS SYSTEM

(71) Applicant: LG Electronics Inc., Seoul (KR)

(72) Inventor: Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 15/113,311

(22) PCT Filed: Jan. 22, 2015

(86) PCT No.: PCT/KR2015/000668
§ 371 (c)(1),
(2) Date: Jul. 21, 2016

(87) PCT Pub. No.: WO2015/111929
PCT Pub. Date: Jul. 30, 2015

(65) Prior Publication Data
US 2017/0006442 A1    Jan. 5, 2017

Related U.S. Application Data

(60) Provisional application No. 61/929,976, filed on Jan. 22, 2014, provisional application No. 61/929,978, (Continued)

(51) Int. Cl.
*H04W 4/14*     (2009.01)
*H04W 48/08*    (2009.01)
(Continued)

(52) U.S. Cl.
CPC .............. *H04W 4/14* (2013.01); *H04W 4/06* (2013.01); *H04W 28/0289* (2013.01);
(Continued)

(58) Field of Classification Search
CPC ..... H04W 4/14; H04W 4/06; H04W 28/0289; H04W 28/08; H04W 48/06; H04W 48/12
(Continued)

(56) References Cited

U.S. PATENT DOCUMENTS

2011/0085455 A1    4/2011    Wu et al.
2011/0087768 A1    4/2011    Wu et al.
(Continued)

FOREIGN PATENT DOCUMENTS

JP    2012-529806 A    11/2012

OTHER PUBLICATIONS

Extended European Search Report issued in corresponding European Patent Application No. 15740826.1 dated Jul. 13, 2017.
(Continued)

*Primary Examiner* — Jae Y Lee
*Assistant Examiner* — Jean F Voltaire
(74) *Attorney, Agent, or Firm* — Morgan, Lewis & Bockius LLP (57) ABSTRACT

The present invention relates to a method and apparatus for an adaptive barring control for a Mobile Originating Short Message Service (MO-SMS). In one aspect of the present invention, a method for controlling an adaptive access class barring in a wireless access system, the method is performed by an enhanced Node-B (eNB) and comprises steps of estimating a SMS load, a MMTEL video load, and a MMTEL voice load on a cell of the eNB; generating a congestion level based on the MMTEL video load and the MMTEL voice load; determining an indication bit by comparing the SMS load with threshold values for the congestion level; and broadcasting an system information block (SIB) message including the indication bit. In this case, the indication bit indicates an open barring, a LessCongested or a MoreCongested to support the adaptive barring control.

12 Claims, 7 Drawing Sheets

Related U.S. Application Data filed on Jan. 22, 2014, provisional application No. 62/054,397, filed on Sep. 24, 2014.

(51) Int. Cl.
| | | |
|---|---|---|
| *H04W 48/06* | (2009.01) | |
| *H04W 4/06* | (2009.01) | |
| *H04W 48/12* | (2009.01) | |
| *H04W 28/08* | (2009.01) | |
| H04W 76/10 | (2018.01) | |
| H04W 28/02 | (2009.01) | |
| H04W 48/16 | (2009.01) | |

(52) U.S. Cl.
CPC .......... *H04W 28/08* (2013.01); *H04W 48/06* (2013.01); *H04W 48/08* (2013.01); *H04W 48/12* (2013.01); *H04W 28/0205* (2013.01); *H04W 48/16* (2013.01); *H04W 76/10* (2018.02)

(58) Field of Classification Search
USPC ........................................................ 370/230
See application file for complete search history.

(56) References Cited

U.S. PATENT DOCUMENTS

| | | |
|---|---|---|
| 2011/0261695 A1 | 10/2011 | Zhao et al. |
| 2012/0051297 A1 | 3/2012 | Lee et al. |
| 2012/0170503 A1 | 7/2012 | Kelley et al. |
| 2013/0242823 A1* | 9/2013 | Lin ........................ H04W 99/00 370/280 |
| 2014/0080531 A1* | 3/2014 | Du ........................ H04W 74/006 455/509 |
| 2015/0004924 A1* | 1/2015 | Kim ........................ H04W 4/90 455/404.1 |
| 2015/0173119 A1* | 6/2015 | Wirtanen ............... H04W 48/06 455/452.1 |
| 2016/0278096 A1* | 9/2016 | Watfa ................ H04W 28/0205 |

OTHER PUBLICATIONS

XP050743141, 3GPP TSG-SA Meeting #65, Taipei, Taiwan, Jan. 20-24, 2014.

Qualcomm, "EAB Mechanism for RAN Overload Control in UMTS," R2-114159, 3GPP TSG-RAN WG2 Meeting #75, Athens, Greece, Aug. 22-26, 2011.

LG Electronics et al., "SCM Solutions for Prioritization of Mobile Originating Voice Services in E-UTRAN," R2-133357, 3GPP TSG-RAN WG2 Meeting #83bis, Ljubljana, Slovenia, Oct. 7-10, 2011.

LG Electronics, "[83bis#13][LTE/SCM] Solutions Candidates for Prioritizing VoLTE," R2-134184, 3GPP TSG-RAN WG2 #84, San Francisco, USA, Nov. 11-15, 2013.

International Search Report and Written Opinion issued in corresponding International Patent Application No. PCT/KR2015/000668 dated May 1, 2015.

Office Action issued in corresponding Japanese Office Action Application No. 2016-547877 dated Oct. 13, 2017.

\* cited by examiner

( a ) Control-Plane Protocol Stack ( b ) User-Plane Protocol Stack

METHOD AND APPARATUS FOR ADAPTIVE BARRING CONTROL FOR MO-SMS IN WIRELESS ACCESS SYSTEM

TECHNICAL FIELD

The present invention relates to a wireless access system, and more particularly, to methods and apparatus for an adaptive barring control for a Mobile Originating Short Message Service (MO-SMS).

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In these days, it has been determined that a Multimedia Telephony Service (MMTEL) voice and video uses normal traffic channels. However, the normal traffic channels are already congested with previous providing services. Therefore, the allowing MMTEL voice and video in E-UTRAN when an Access Class Barring (ACB) is active will cause the congestion more severely.

To help reduce the congestion while at the same time providing an alternative form of human to human communication, the use of MO+MT(Mobile Terminating) SMS (which uses NAS signaling) in the congested cells should be allowed as well. Ideally the operator should be able to separately allow MMTEL voice, MO+MT SMS, or both in such situations via configuration, in order to most effectively provide some means of human to human communication whilst the congestion is being managed.

DETAILED DESCRIPTION OF THE INVENTION

Technical Problems

Currently, the MO-SMS is subject to the ACB. Therefore, it is need to newly define the process for access class barring control for MO-SMS.

Accordingly, the object of the present invention is to provide methods and apparatuses for adaptive barring control for the MO-SMS to obviate one or more of the problems due to limitations and disadvantages of the related art.

Another object of the present invention is to define parameters, such as a new access barring factor and a barring time for control the access barring for the MO-SMS.

Still another object of the present invention is to propose a method for determining an indication bits included in a system information block for control the access barring for the MO-SMS by considering loads of the MO-SMS, MMTEL voice and MMTEL video.

Still another object of the present invention is to provide a user equipment (UE) and/or a base station apparatus for supporting the above-described methods.

Technical problems to be solved by the present invention are not limited to the above-mentioned technical problem, and other technical problems not mentioned above can be clearly understood by one skilled in the art from the following description.

Technical Solutions

The present invention relates to a method and apparatus for an adaptive barring control for a Mobile Originating Short Message Service (MO-SMS).

In one aspect of the present invention, a method for controlling an adaptive access class barring in a wireless access system, the method is performed by an enhanced Node-B (eNB) and comprises steps of estimating a SMS load, a MMTEL video load, and a MMTEL voice load on a cell of the eNB; generating a congestion level based on the MMTEL video load and the MMTEL voice load; determining an indication bit by comparing the SMS load with threshold values for the congestion level; and broadcasting an system information block (SIB) message including the indication bit. In this case, the indication bit indicates an open barring, a LessCongested or a MoreCongested to support the adaptive barring control.

The LessCongested may indicate the SMS load is medium high.

The MoreCongested may indicate the SMS load is severely high.

The open barring may indicate the access class barring is opened.

In another aspect of the present invention, a method for controlling an adaptive access class barring in a wireless access system, the method is performed by an User Equipment (UE) and comprises the steps of receiving an system information block (SIB) message including an indication bit; drawing an uniform random number between 0 and 1; comparing the drawn uniform random number with a congestion level indicated by the indication bit; and performing an access attempt to a eNB, if the drawn uniform random number is less than the congestion level; or re-drawing an uniform random number between 0 and 1, if the drawn uniform random number is bigger than and equal to the congestion level.

The indication bit may indicate an open barring, a LessCongested or a MoreCongested to support the adaptive barring control.

The open barring may indicate the access class barring is opened, the LessCongested may indicate the SMS load is medium high, and the MoreCongested may indicate the SMS load is severely high.

The method further comprises step of transmitting the MO-SMS to the eNB after the access attempt is success.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to exemplary embodiments of the present invention, the following advantages can be obtained.

First of all, the present inventions are able to provides an adaptive and finer granularity for accommodating the MO-SMS.

Besides, this is also beneficial to use when the MMTEL voice and MMTEL video have a different level of congestion.

In addition, the second embodiments of the present application can be extended to other methods of reusing ACB and EAB, CSFB-AC(Circuit Switch Fallback-Access Control) in the similar way.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Exemplary embodiments of the present invention provide a method and apparatus for an adaptive barring control for a Mobile Originating Short Message Service (MO-SMS).

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 22.011, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink.

LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

Figure 1:
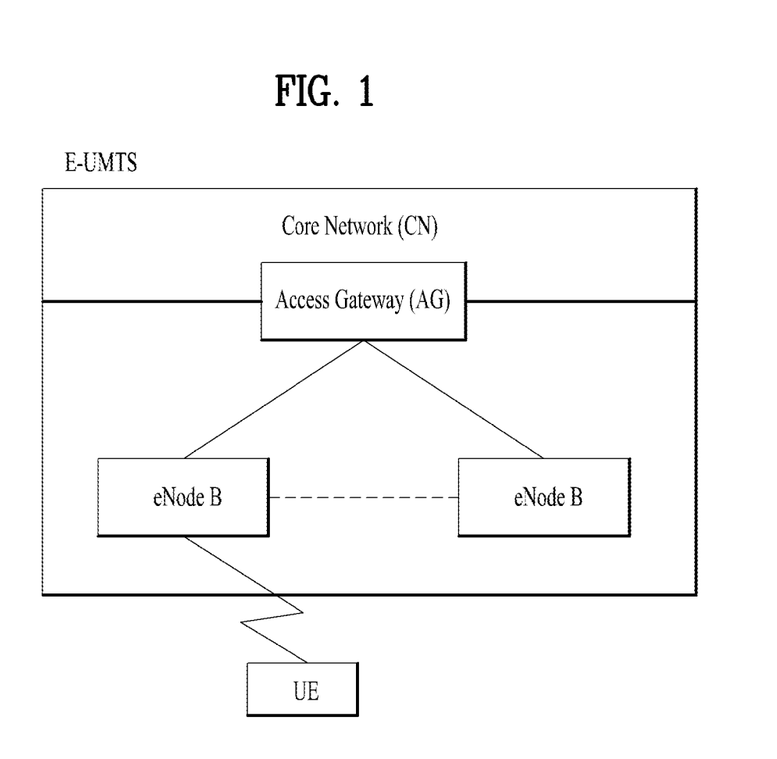
FIG. 1 illustrates a schematic structure a network structure of an evolved universal mobile telecommunication system (E-UMTS)

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
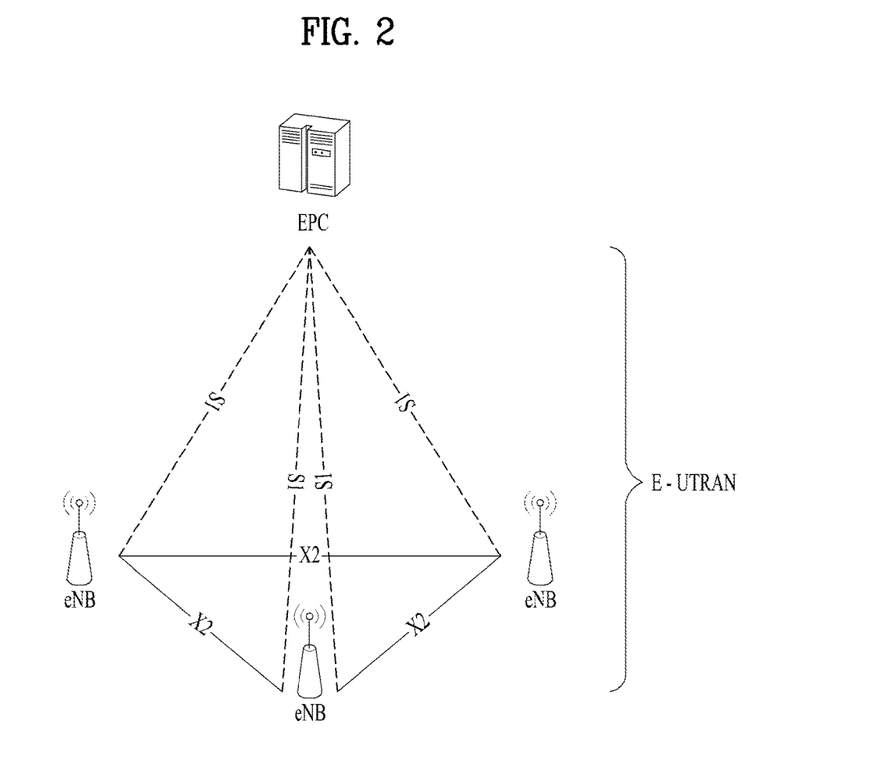
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like.

Figure 3:
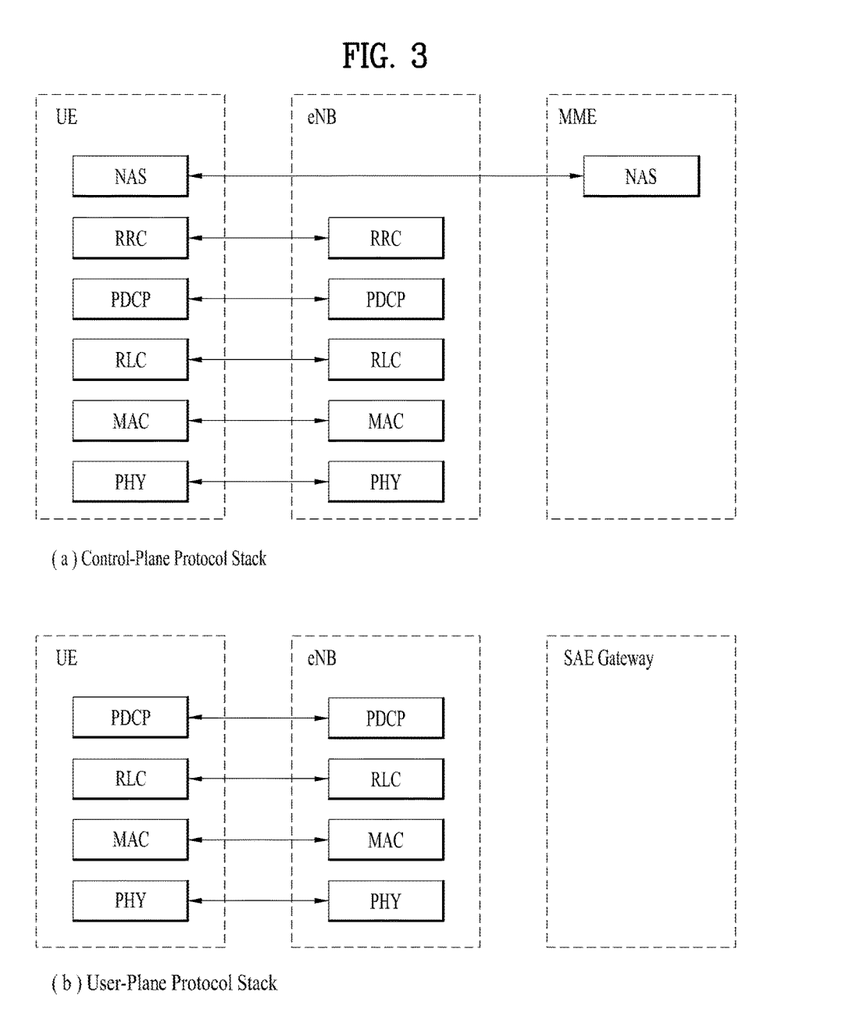
FIG. 3 illustrates the configurations of a radio interface protocol between the E-UTRAN and a UE.

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Location Registration

A Public Land Mobile Network (PLMN) is a network established and operated by an Administration or RPOA for the specific purpose of providing land mobile communication services to the public. The PLMN provides communication possibilities for mobile users. For communication between mobile and fixed users, interworking with a fixed network is necessary. Therefore, PLMNs shall provide a location registration function with the main purpose of providing continuity of service to UEs over the whole system area. The location registration function shall be such as to allow:

Fixed subscribers to call a UE by only using the directory number of the UE irrespective of where the UE is located in the system area at the time of the call.

UEs to access the system irrespective of the location of the UE.

UEs to identify when a change in location area has taken place in order to initiate automatic location updating procedures.

2. Access Control

Under certain circumstances, it will be desirable to prevent UE users from making access attempts (including emergency call attempts) or responding to pages in specified areas of the PLMN. Such situations may arise during states of emergency, or where 1 of 2 or more co-located PLMNs has failed.

Broadcast messages should be available on a cell by cell basis indicating the class(es) or categories of subscribers barred from network access. The use of these facilities allows the network operator to prevent overload of the access channel under critical conditions. It is not intended that access control be used under normal operating conditions. In addition, it should be possible to differentiate access control between Circuit Switched (CS) and Packet Switched (PS) domains.

Information on cell access restrictions associated with the Access Classes is broadcast as system information. The UE shall ignore Access Class related cell access restrictions when selecting a cell to camp on, i.e. it shall not reject a cell for camping on because access on that cell is not allowed for any of the Access Classes of the UE. A change of the indicated access restriction shall not trigger cell re-selection by the UE.

Access Class related cell access restrictions shall be checked by the UE before sending an RRC CONNECTION REQUEST message when entering Connected Mode from UTRAN Idle mode.

Access Class related cell access restrictions, if it is sent as a part of Domain Specific Access Restriction parameters, shall also be checked by the UE before sending INITIAL DIRECT TRANSFER message.

Access Class related cell access restrictions, if it is sent as a part of Paging Permission with Access Control Parameters, shall be checked by the UE before sending a response to a paging message or before initiating a Location/Registration procedure.

Access Class related cell access restrictions, if it is sent as a part of Extended Access Barring parameters, shall be checked by the UE before sending an RRC CONNECTION REQUEST message or INITIAL DIRECT TRANSFER message subject to extended access barring as indicated by higher layers.

Otherwise, cell access restrictions associated with the Access Classes shall not apply for a UE which already is in Connected Mode.

2.1 Access Class allocation

All UEs are members of one out of ten randomly allocated mobile populations, defined as Access Classes 0 to 9. The population number is stored in the SIM/USIM. In addition, UEs may be members of one or more out of 5 special categories (Access Classes 11 to 15), also held in the SIM/USIM. These are allocated to specific high priority users as following Table 1 (The enumeration is not meant as a priority sequence).

TABLE 1

| Access Classes | Target |
| --- | --- |
| Class 15 | PLMN Staff |
| Class 14 | Emergency Services |
| Class 13 | Public Utilities (e.g. water/gas suppliers) |
| Class 12 | Security Services |
| Class 11 | For PLMN Use |

2.2 Access Class Barring (ACB)

If the UE is a member of at least one Access Class which corresponds to the permitted classes as signaled over the air interface, and the Access Class is applicable in the serving network, then access attempts are allowed. Additionally, in the case of the access network being UTRAN the serving network can indicate that UEs are allowed to respond to paging and perform location registration, even if their access class is not permitted. Otherwise access attempts are not allowed. Also, the serving network can indicate that UEs are restricted to perform location registration, although common access is permitted. If the UE responded to paging it shall follow the normal defined procedures and react as specified to any network command. In this case, the network operator can take the network load into account when allowing UEs access to the network.

Access Classes are applicable as following Table 2.

TABLE 2

| Classes | Entity |
| --- | --- |
| Classes 0-9 | Home and Visited PLMNs |
| Classes 11 and 15 | Home PLMN only if the EHPLMN list is not present or any EHPLMN |
| Classes 12, 13, 14 | Any number of these classes may be barred at any one time. |

In the case of multiple core networks sharing the same access network, the access network shall be able to apply Access Class Barring for the different core networks individually.

The following is the requirements for enhanced Access control on E-UTRAN.

The serving network shall be able to broadcast parameters of 'mean durations of access control' and 'barring rates (e.g. percentage value)' that commonly applied to Access Classes 0-9 to the UE. The same principle as in UMTS is applied for Access Classes 11-15.

E-UTRAN shall be able to support access control based on the type of access attempt (i.e. Mobile Originating (MO) data or MO signaling), in which indications to the UEs are broadcasted to guide the behavior of UE. E-UTRAN shall be able to form combinations of access control based on the type of access attempt e.g., (1) a mobile originating and a mobile terminating (MO and MT), (2) a mobile originating (MO), or (3) a location registration. The 'mean duration of access control' and the 'barring rate' parameters are broadcast for each type of access attempt (i.e. mobile originating data or mobile originating signaling).

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed; otherwise, the access attempt is not allowed. If the access attempt is not allowed, further access attempts of the same type are then barred for a time period that is calculated based on the 'mean duration of access control' parameter provided by the network and the random number drawn by the UE.

The serving network shall be able to indicate whether or not a UE shall apply Access Class Barring for Short Message Service (SMS) access attempts in SMS over SGs, SMS over IMS (Internet protocol Multimedia Subsystem), and SMS over S102. This indication is valid for Access Classes 0-9 and 11-15.

The serving network shall be able to indicate whether or not a UE shall apply Access Class Barring for Multimedia Telephony service (MMTEL) voice access attempts. This indication is valid for Access Classes 0-9 and 11-15.

The serving network shall be able to indicate whether or not a UE shall apply Access Class Barring for MMTEL video access attempts. This indication is valid for Access Classes 0-9 and 11-15.

2.3 Service Specific Access Control

In E-UTRAN it shall be possible to support a capability called Services Specific Access Control (SSAC) to apply independent access control for telephony services (MMTEL) for mobile originating session requests from idle-mode and connected-mode as following:

The serving network shall be able to indicate (as specified in sub-clause 2.2) whether or not a UE subject to SSAC shall also apply Access Class Barring.

An Evolved Packet System (EPS) shall provide a capability to assign a service probability factor and mean duration of access control for each of MMTEL voice and MMTEL video:

assign a barring rate (percentage) commonly applicable for Access Classes 0-9.

assign a flag barring status (barred/unbarred) for each Access Class in the range 11-15.

SSAC shall not apply to Access Class 10.

SSAC can be provided by the VPLMN based on operator policy without accessing the HPLMN.

SSAC shall provide mechanisms to minimize service availability degradation (i.e. radio resource shortage) due to the mass simultaneous mobile originating session requests and maximize the availability of the wireless access resources for non-barred services.

The serving network shall be able to broadcast mean durations of access control, barring rates for Access Classes 0-9, barring status for Access class in the range 11-15 to the UE.

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed; otherwise, the access attempt is not allowed. If the access attempt is not allowed, further access attempts of the same type are then barred for a time period that is calculated based on the 'mean duration of access control' parameter provided by the network and the random number drawn by the UE.

3. Adaptive Barring Control for MO-SMS

To control the ACB for the MO-SMS, each RAN node is able to indicate whether the SMS related access is to be subjected to ACB controls or not, when ACB is applied. If the RAN node indicates that SMS related access is not subjected to ACB, then SMS related access shall be open.

However, if the congestion level is considered high, there is a need to use some forms of access barring that can have a fine granularity of control. For example, a fraction of access barring as in ACB can be used.

3.1 A First Method for Adaptive Barring Control for MO-SMS

To use an adaptive barring control for the MO-SMS, it is needed to define a new barring configuration Information Element (IE). For example, fields, such as a 'sms-Barringtime' and a 'sms-Barringfactor', are newly defined.

The 'sms-Barringtime' is a new mean access barring time value in seconds for the MO-SMS. The 'sms-Barringtime' represents the time duration of prohibited time to access the network. In this case, values of the 'sms-Barringtime' field are set to 1, 2, 4, 8, 16, 32 subframes.

In addition, the 'sms-Barringfactor' represents the access success possibility of a network access. That is, if the random number drawn by the UE is lower than the value indicated by the 'sms-Barringfactor', access is allowed. Otherwise the access is barred. This values are interpreted in a range of {0, 5, 10, . . . , 95%}. In this case, 0% means all of the UEs are barred and 95% means most of the UEs which attempt to access can be allowed.

The fields of 'sms-Barringtime' and 'sms-Barringfactor' can be included in a System Information Block 2 (SIB2) to broadcast.

Figure 4:
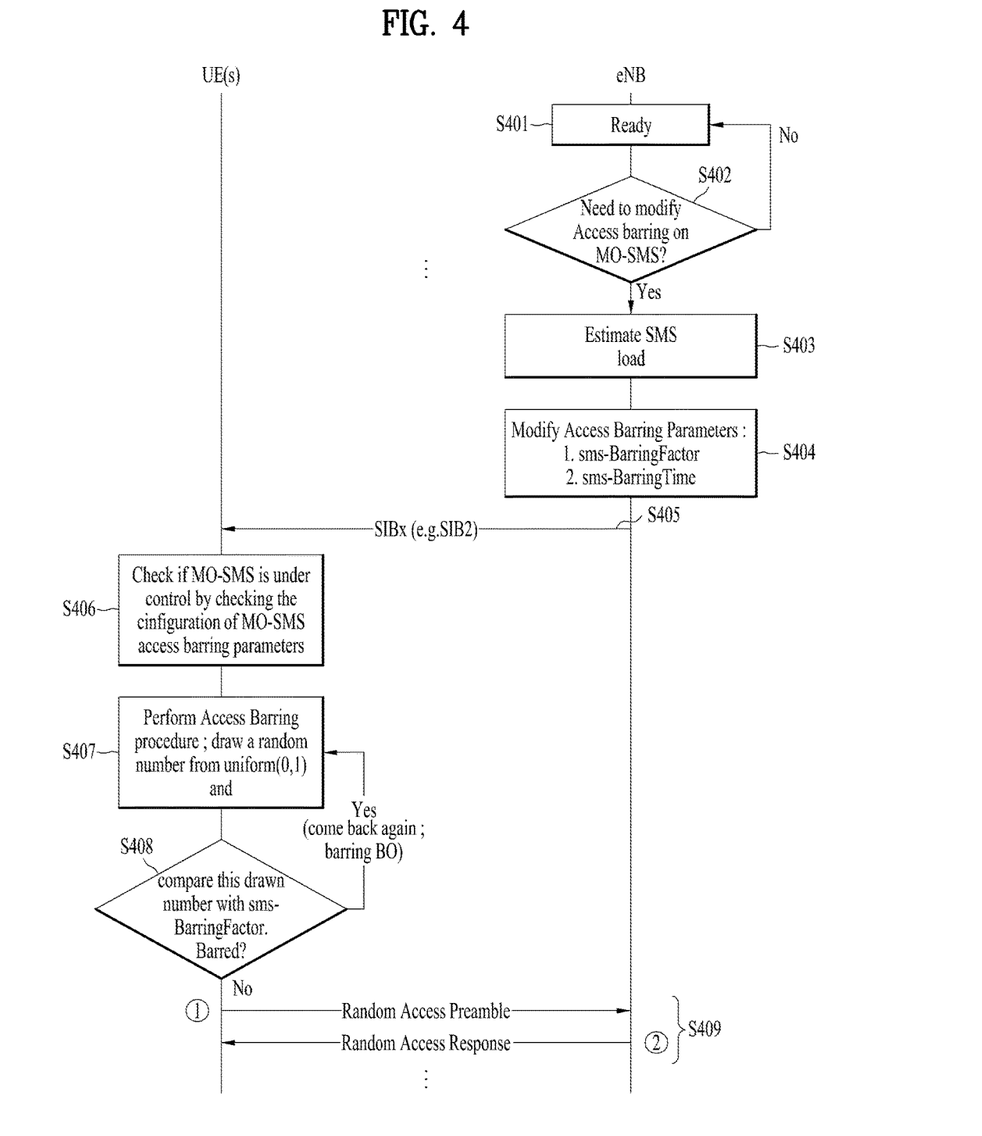
FIG. 4 illustrates one of methods for Adaptive barring control for the MO-SMS.

FIG. 4 illustrates one of methods for Adaptive barring control for the MO-SMS.

Referring to FIG. 4, the base station (eNB) is ready to control an access class barring for user equipments (UEs) in cells which the base station manages (S401).

The eNB determines whether there is needed to modify the access class barring on MO-SMS (S402).

If it is a need to modify the access class barring on the MO-SMS, the eNB estimates SMS load on the network (S403).

If there is no need to modify the access barring on the MO-SMS, the eNB returns the ready state.

The eNB modifies access class barring parameters (or, fields) based on the estimated SMS loads. For example, as discussed above, the eNB modifies the previous access class barring parameters by adding newly defined access barring parameters, such as 'sms-BarringFactor' and 'sms-Barringtime' (S404).

After that, the eNB transmits the 'sms-Barring Factor' and 'sms-Barring time' parameters through system information block (SIB) message (e.g., SIB2) (S405).

The SIB message is broadcast in the cells managed by the eNB. In this case, the UEs which have not been registered to the eNB are also able to decode the SIB message because the SIB includes system information of the eNB and is subject to all the UEs in the cell area. Accordingly, by using the SIB, the UE in the cells of the eNB can check that whether an access of the UE is barred or not.

The UE check if MO-SMS is under control by checking the configuration of MO-SMS access baring parameters which have been received via the SIB (S406).

Then the UE determines the barring status with the SIB. For example, the UE draws uniform a random number between 0 and 1 (S407), and compares this drawn uniform random number with the sms-Barringfactor to determine whether it is barred or not (S408).

At the step of S408, if the uniform random number is less than the sms-BarringFactor value, the access attempt is allowed. So, the UE performs random access procedure with the eNB (S409).

At the step of S408, if the uniform random number is more than or equal to the sms-BarringFactor value, the access attempt is not allowed. So, the UE come back step S407.

3.2 A Second Method for Adaptive Barring Control for MO-SMS

Previously MMTEL voice and MMTEL video services are provided via the circuit switched (CS) network. However, in these days, the MMTEL voice and MMTEL video services are provided via the packet switched (PS) network. Under this situation, the MO-SMS service is provided via the PS network also. So, to more exactly control the ACB for the MO-SMS, it is preferable that the eNB considers the load of the MMTEL voice and MMTEL video services also when the eNB configures the access class barring parameters for the MO-SMS.

Figure 5:
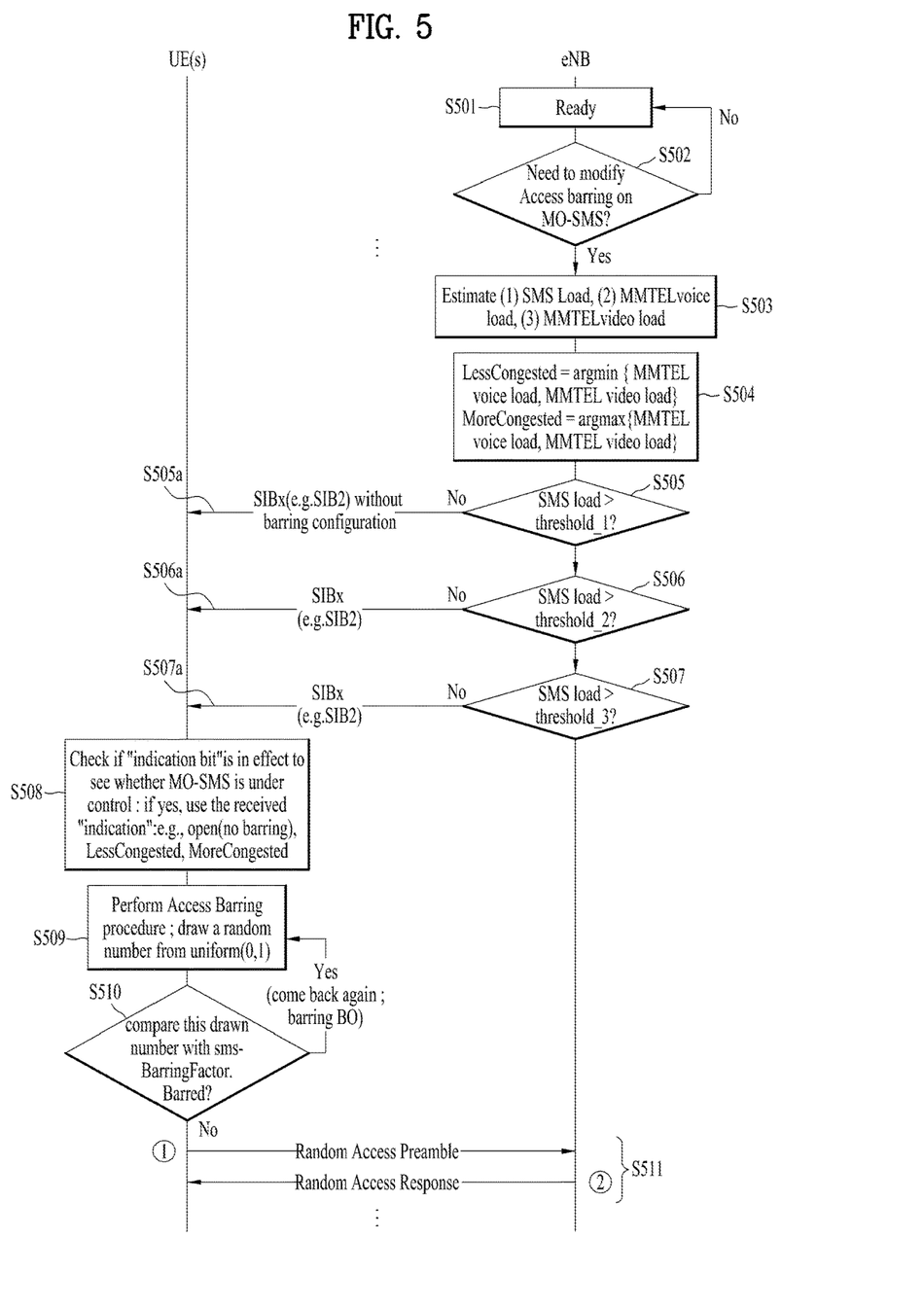
FIG. 5 illustrates another method for Adaptive barring control for the MO-SMS.

FIG. 5 illustrates another method for Adaptive barring control for the MO-SMS.

Referring to FIG. 5, the base station (eNB) is ready to control an access class barring for user equipments (UEs) in cells which the eNB manages (S501).

The eNB determines whether there is a need to modify the access class barring on the MO-SMS (S502).

If there is no need to modify the access barring on the MO-SMS, the eNB returns the ready state.

If it is a need to modify the access class barring on the MO-SMS, the eNB estimates SMS load, MMTEL voice load and/or MMTEL video load on the network (S503).

At the step of S503, the eNB may estimate the loads of the MO-SMS, the MMTEL voice and/or the MMTEL video in consideration of the number of attempts for initiating session per minute. For example, the number of the UE's attempts from an idle mode to a normal mode can be used for estimate the loads.

The eNB generates RACH congestion levels by using the MMTEL voice load and the MMTEL video loads. In this case, the eNB has three thresholds (e.g., threshold_1, threshold_2, and threshold_3) and the RACH congestion level can be defined as 'lessCongested' and 'MoreCongested' based on the threshold. The congestion level of 'lessCongested' can be calculated as following Equation 1 and the congestion level of 'moreCongested' can be calculated as following Equation 2 (S504).

'LessCongested'=argmin {MMTEL voice load, MMTEL video load}　　　　[Equation 1]

'moreCongested'=argmax {MMTEL voice load, MMTEL video load}　　　　[Equation 2]

At Equation 1, the meaning of function 'argmin' stands for the argument of the minimum, that is to say, the set of points of the given argument for which the given function attains its minimum value. In addition, at Equation 2, the meaning of function 'argmax' stands for the argument of the maximum, that is to say, the set of points of the given argument for which the given function attains its maximum value.

Referring back to FIG. 5, the eNB has three thresholds (e.g., threshold_1, threshold_2, and threshold_3) to determine indication bits which are used for adaptive barring control on the MO-SMS. So, the eNB compares the MO-SMS loads with the threshold_1 which represent least congested (S505).

At the step of S505, if the SMS load is less than or equal to the threshold_1, then the eNB transmits the SIB message (e.g., SIB2) without barring configuration in order to indicate an open of the access class barring on the MO-SMS. That is, if the SMS load is expected to be tolerably high to the eNB, then the eNB send the SIB message including an indication bit representing the open MO-SMS barring (S505a).

If SMS load is expected to be medium high, the eNB sets the indication bit to indicate the 'LessCongested' level and transmits the indication bit through the SIB message (i.e., SIB2). That is, the SMS load is bigger than and equal to the threshold_1 but is less than the threshold_2, the eNB transmits the SIB message including the indication bit (S506, S506a).

If SMS load is expected to be severely high, the eNB sets the indication bit to indicate the 'MoreCongested' level and transmits the indication bit through the SIB message (i.e., SIB2). That is, if the SMS load is bigger than and equal to the threshold_2 but is less than the threshold_3, the eNB transmits the SIB message including the indication bit (S507, S507a).

The SIB message is broadcast in the cells managed by the eNB. In this case, the UEs which have not been registered to the eNB are also able to decode the SIB message because the SIB is subject to broadcast to every cell area and includes system information of the eNB. Accordingly, by using the SIB, the UE in the cells of the eNB can check that whether an access of the UE is barred or not.

The UE check the 'indication bit' in the SIB. If the indication bit is in effect to see whether MO-SMS is under control, then the UE determines the barring status with the SIB. For example, the UE draws uniform a random number between 0 and 1 (S508, S509), and compares this drawn uniform random number with the congestion level indicated by the indication bit to determine whether it is barred or not (S510).

The congestion level may be set as 'open barring', 'LessCongested' or 'MoreCongested' to support the adaptive barring control. In this case, the congestion level can be set as a specific value for representing the three kinds of levels. As another approach, the congestion level can be set as a form of the sms-barringfactor which is newly defined as explained above FIG. 4. In this case, the sms-barringfactor can be classified as three categories and one of them can be transmitted to indicate the congestion level.

At the step of S510, if the uniform random number is less than the congestion level indicated by the SIB, the access attempt is allowed. So, the UE performs random access procedure with the eNB (S511).

At the step of S510, if the uniform random number is more than or equal to the congestion level, the access attempt is not allowed. So, the UE come back step S509. The step S509 can be performed every time when the condition has been satisfied. Namely, one success in a random draw holds well for the following random access attempt, for next attempt, the UE may do it again.

Accordingly, as the indication bits in the SIB have been set in consideration of the loads of the MMTEL voice and MMTEL video, the access barring control can be more effectively applied to the MO-SMS.

Regarding to steps S505a, S506a, and S507a, there is only one SIB message transmitted according to the determining procedure through steps S505 to S507. That is, the SIB message of step S507a can be transmitted when all of the conditions of S505, 506 and S507 are satisfied.

Figure 6:
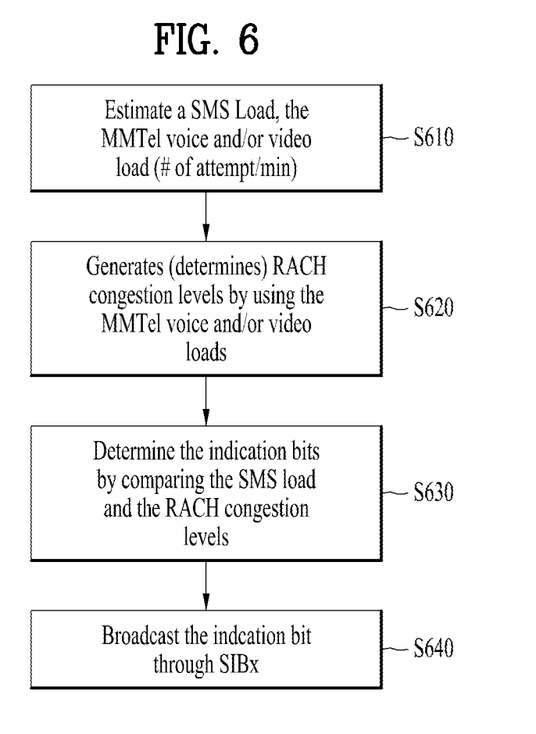
FIG. 6 illustrates a flow chart summering the method for Adaptive barring control for MO-SMS in view of the eNB on FIG. 5.

FIG. 6 illustrates a flow chart summering the method for Adaptive barring control for MO-SMS in view of the eNB on FIG. 5.

Referring to FIG. 6, the eNB estimates a SMS load, the MMTEL voice and/or MMTEL video loads (S610).

The eNB generates RACH congestion level by using the MMTEL voice and/or the MMTEL video loads (S620).

After that, the eNB is able to determine the indication bits by comparing the SMS load and the RACH congestion levels (S630).

Finally, the eNB broadcast the indication bits through SIBx message.

4. Apparatuses for Implementing the Aforementioned Methods

Figure 7:
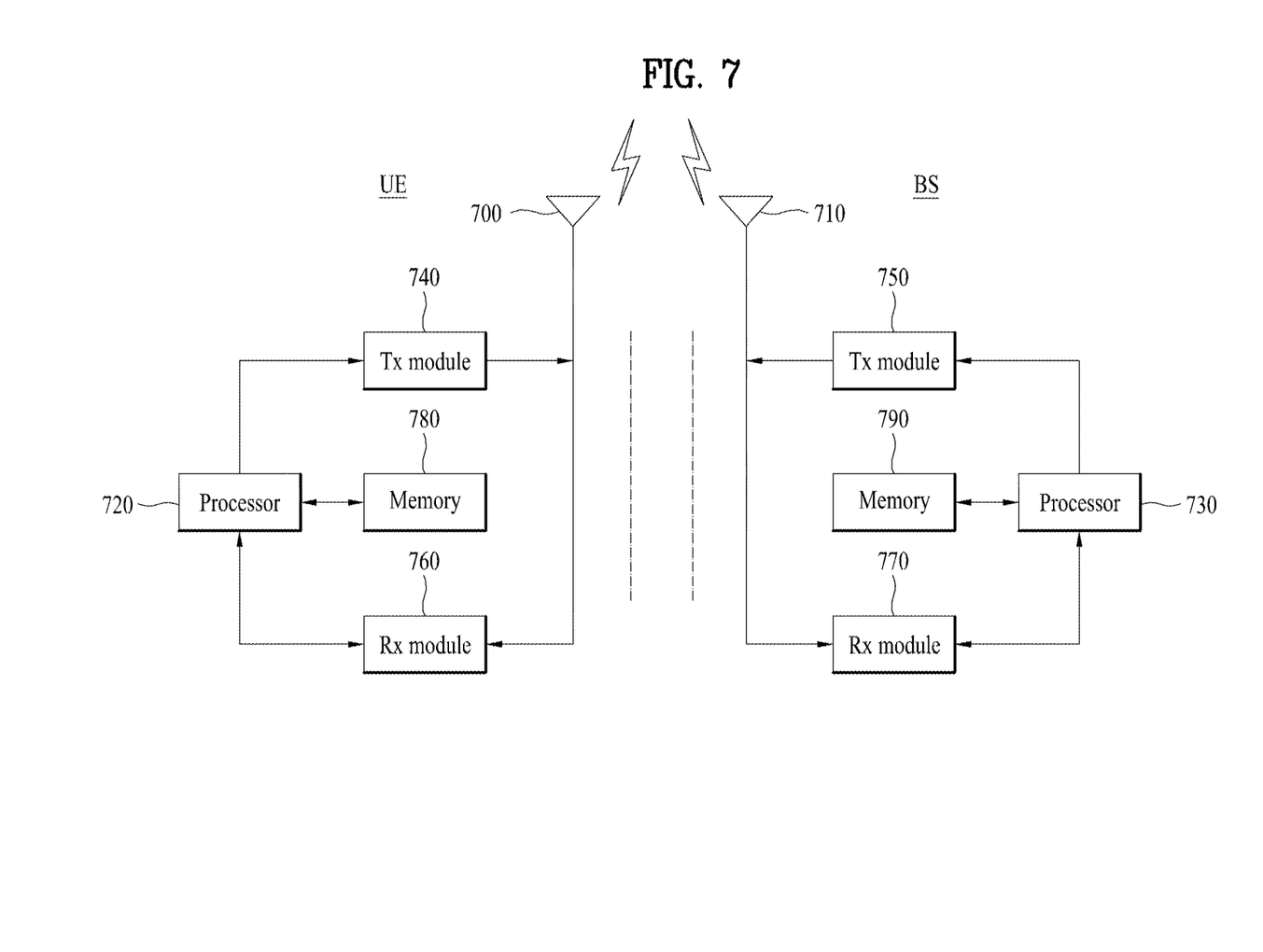
FIG. 7 shows apparatuses for implementing the above-mentioned methods described with reference to FIGS. 1 to 6.

FIG. 7 shows apparatuses for implementing the above-mentioned methods described with reference to FIGS. 1 to 6.

A UE can serve as a transmitter on uplink and as a receiver on downlink. An eNB can serve as a receiver on uplink and as a transmitter on downlink.

The UE and the eNB may include transmission modules (Tx modules) 740 and 750 and reception modules (Rx modules) 760 and 770 for controlling transmission and reception of signal, data and/or messages and antennas 700 and 710 for transmitting and receiving signal, data and/or messages, respectively.

In addition, the UE and the eNB may respectively include processors 720 and 730 for performing the above-described embodiments of the present invention and memories 770 and 790 for storing processing procedures of the processors temporarily or continuously.

The embodiments of the present invention can be performed using the aforementioned components and functions of the UE and the eNB. The apparatuses shown in FIG. 7 may be one of members illustrated in FIGS. 1 and 2. The processors 720 and 730 preferably include the components shown in FIGS. 2, 3 and 4.

The processor 720 of the UE can receive the SIB messages broadcast by the eNB. Particularly, an LTE-A UE can check the MO-SMS is under control by checking the newly defined sms-barring parameters or the indication bits included in the SIB. In addition, the processor 720 is able to draw a uniform random number between 0 to 1 and compare it with the sms-barringfactor or the indication bit to determine that the access class of the UE is barred or not.

In addition, the processor 730 of the eNB can configure the SIB message including the newly defined sms-barring parameters or the indication bits based on the estimated loads of the MO-SMS, the MMTEL voice and/or the MMTEL video. In addition, the processor 730 of the eNB also generates the RACH congestion level such as 'lesscongested' and 'morecongested' to determine the indication bits.

The transmission modules 740 and 750 and the reception modules 760 and 770 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

What is claimed is:

1. A method for controlling an adaptive Access Class Barring (ACB) in a wireless access system, the method being performed by an User Equipment (UE) and comprising:
   receiving a System Information Block (SIB) message including indication bits indicating one of three random access channel (RACH) congestion levels;
   comparing a uniform random number with the one of three RACH congestion levels, the uniform random number being between 0 and 1, the three RACH congestion levels including: an open barring, a LessCongested level, and a MoreCongested level; and
   performing an access attempt to an evolved Node-B (eNB) based on barring factors defined according to the RACH congestion levels if the indication bits indicate the open barring or if the drawn uniform random number is less than a specific value represented by the LessCongested level or the MoreCongested level,
   wherein the three RACH congestion levels are generated based on a Multimedia Telephony service MMTEL voice load and a MMTEL video load, and
   wherein the MoreCongested level represents a higher specific value of the barring factors than a specific value represented by the LessCongested level.

2. The method according to claim 1, wherein the SIB message does not include a barring configuration when the indication bits indicate the open barring.

3. The method according to claim 1, further comprising transmitting a Short Message Service (SMS) to the eNB when the adaptive ACB is opened or when an access attempt of the UE is successful based on the LessCongested level or the MoreCongested level.

4. A method for controlling an adaptive Access Class Barring (ACB) in a wireless access system, the method being performed by an evolved Node-B (eNB) and comprising:
   determining whether to modify an ACB on a Short Message Service (SMS);
   estimating an SMS load, a Multimedia Telephony service (MMTEL) voice load, and a MMTEL video load on the wireless access system based on a number of attempts of User Equipments (UEs) for an initiation session per minute;
   generating three Random Access Channel (RACH) congestion levels based on the MMTEL voice load and the MMTEL video load;
   determining indication bits that are used for the adaptive ACB by comparing the SMS load with the three RACH congestion levels; and
   transmitting a System Information Block (SIB) message including indicating bits indicating one of the three RACH congestion levels;
   wherein the three RACH congestion levels include: an open barring, a LessCongested level, and a MoreCongested level,
   wherein the adaptive ACB is opened when the indication bits indicate the open barring, or when the adaptive ACB is performed based on a specific value represented by the LessCongested level or the MoreCogested level, and
   wherein the MoreCongested level represents a higher specific value of the barring factors than a specific value represented by the LessCongested level.

5. The method according to claim 4, wherein the SIB message does not include a barring configuration when the indication bits indicate that the SMS is opened.

6. The method according to claim 4, further comprising receiving the SMS from a user equipment (UE) when the adaptive ACB is opened or when an access attempt of the UE is successful based on the LessCongested level or the MoreCongested level.

7. A User equipment (UE) for controlling an adaptive Access Class Barring (ACB) in a wireless access system, the UE comprising:
   a receiver;
   a transmitter; and
   a processor for controlling the adaptive ACB, the processor being configured to:
      receive, by using the receiver, a System Information Block (SIB) message including indication bits indicating one of three random access channel (RACH) congestion levels;
      compare a uniform random number with the one of three RACH congestion levels, the uniform random number being between 0 and 1, the three RACH congestion levels including: an open barring, a LessCongested level, and a MoreCongested level; and
      perform, by using the receiver and the transmitter, an access attempt to an evolved Node-B (eNB) based on barring factors defined according to the RACH congestion levels if the indication bits indicates the open barring or if the drawn uniform random number is less than a specific value represented by the LessCongested level or the MoreCongested level,
      wherein the three RACH congestion levels are generated based on a Multimedia Telephony service MMTEL voice load and a MMTEL video load, and
      wherein the MoreCongested level represents a higher specific value of the barring factors than a specific value represented by the LessCongested level.

8. The UE according to claim 7, wherein the SIB message does not include a barring configuration when the indication bits indicate the open barring.

9. The UE according to claim 7, wherein the processor is further configured to transmit, by using the transmitter, a Short Message Service (SMS) to the eNB when the adaptive ACB is opened or when an access attempt of the UE is successful based on the LessCongested level or the MoreCongested level.

10. An evolved Node-B (eNB) for controlling an adaptive Access Class Barring (ACB) in a wireless access system, the eNB comprising:
   a receiver;
   a transmitter; and
   a processor for controlling the adaptive ACB, the processor being configured to:
   determine whether to modify an ACB on a Short Message Service (SMS);
   estimate a SMS load, a Multimedia Telephony service (MMTEL) voice load and a MMTEL video load on the wireless access system in consideration of a number of attempts of User Equipments (UEs) for an initiation session per minute;
   generate three Random Access Channel (RACH) congestion levels based on the MMTEL voice load and the MMTEL video load;
   determine indication bits which are used for the adaptive ACB by comparing the SMS load with the three RACH congestion levels; and
   transmit, by using the transmitter, an System Information Block (SIB) message including indication bits indicating one of the three RACH congestion levels, wherein the three RACH congestion levels are an open barring, a LessCongested level and a MoreCongested level, wherein the adaptive ACB is opened when the indication bits indicates the open barring, or the adaptive ACB is performed based on a specific value represented by the LessCongested level or the MoreCogested level, and wherein the MoreCongested level represents more higher specific value of the barring factors than a specific value represented by the LessCongested level.

11. The eNB according to claim 10, wherein the SIB message does not include a barring configuration when the indication bits indicate that the MO-SMS is opened.

12. The eNB according to claim 10, wherein the processor is further configured to receive, by using the receiver, a short message service (SMS) from the UE when the adaptive ACB is opened or when an access attempt of the UE is successful based on the LessCongested level or the MoreCongested level.

* * * * *